(12) United States Patent
Ray

(10) Patent No.: US 9,517,851 B2
(45) Date of Patent: Dec. 13, 2016

(54) METHOD AND APPARATUS FOR REMOVING AIR FROM AN ARTICLE-FILLED BAG WITH OSCILLATING RINGS

(71) Applicants: BAXTER INTERNATIONAL INC., Deerfield, IL (US); BAXTER HEALTHCARE S.A., Glattpark (Opfikon) (CH)

(72) Inventor: Adam G. Ray, Dana Point, CA (US)

(73) Assignees: BAXTER INTERNATIONAL INC., Deerfield, IL (US); BAXTER HEALTHCARE S.A., Glattpark (Opfikon) (CH)

( * ) Notice: Subject to any disclaimer, the term of this patent is extended or adjusted under 35 U.S.C. 154(b) by 710 days.

(21) Appl. No.: 13/955,604

(22) Filed: Jul. 31, 2013

(65) Prior Publication Data
US 2015/0033670 A1 Feb. 5, 2015

(51) Int. Cl.
| | |
|---|---|
| *B65B 31/02* | (2006.01) |
| *B65G 39/04* | (2006.01) |
| *F16C 13/00* | (2006.01) |
| *B65B 31/00* | (2006.01) |
| *B65B 5/04* | (2006.01) |
| *B65B 5/06* | (2006.01) |
| *B65B 9/20* | (2012.01) |

(52) U.S. Cl.
CPC ............. *B65B 31/024* (2013.01); *B65B 5/045* (2013.01); *B65B 5/067* (2013.01); *B65B 9/2049* (2013.01); *B65B 31/00* (2013.01); *B65G 39/04* (2013.01); *F16C 13/00* (2013.01)

(58) Field of Classification Search
CPC .... D21G 1/0206; D21G 1/0213; D21G 1/022; B65G 39/04; B65B 9/2049; B65B 61/24; B65B 1/24; B65B 5/045; B65B 5/067; B65B 31/00; B65B 31/02; B65B 31/024; B65H 2404/13–2404/14; F16C 13/00; F16C 13/024; F16C 13/026; F16C 13/06; B29C 66/81461
USPC .................. 53/113, 116, 121, 432, 434, 436, 405,53/408, 523–529, 79, 110; 492/38–40, 49–56, 492/6, 7, 16; 141/65; 100/153, 90; 156/130.3, 156/412, 421
See application file for complete search history.

(56) References Cited

U.S. PATENT DOCUMENTS

| | | | |
|---|---|---|---|
| 1,594,875 A | * | 8/1926 | Brenner .................... C14B 1/14 492/16 |
| 1,649,362 A | | 11/1927 | Nagel |
| 2,682,216 A | | 6/1954 | Shields |
| 3,070,931 A | | 1/1963 | Zwight |

(Continued)

*Primary Examiner* — Stephen F Gerrity
*Assistant Examiner* — Joshua Kotis
(74) *Attorney, Agent, or Firm* — Greer, Burns & Crain, Ltd.

(57) ABSTRACT

An apparatus is provided for removing air from a bag containing articles while the bag is traveling on a moving conveyor belt. A horizontal shaft is disposed in operational relationship to the conveyor belt. A plurality of rings is provided such that each ring has a thickness and a centered opening dimensioned to loosely accommodate the shaft, and also to rotationally oscillate relative to the shaft. Each ring is vertically displaceable relative to the shaft. Each ring independently generally follows a contour defined by the articles to expel air by downwardly depressing an outer surface of the bag under gravity caused by weight of each ring while the bag is carried on the conveyor belt below the rings. A radial distance between the shaft and the ring is greater than a diameter of the shaft.

17 Claims, 6 Drawing Sheets

(56) References Cited

U.S. PATENT DOCUMENTS

| | | | |
|---|---|---|---|
| 3,233,527 A | | 2/1966 | Membrino |
| 3,526,078 A | | 9/1970 | Dye |
| 3,581,876 A | | 6/1971 | Keith |
| 3,619,974 A | * | 11/1971 | Kupcikevicius ........ B65B 31/00 53/512 |
| 5,117,750 A | | 6/1992 | Mosier |
| 5,433,061 A | * | 7/1995 | Hutchinson ............. B65B 61/24 53/136.5 |
| 6,158,199 A | * | 12/2000 | Emery, III ............ B65B 53/063 53/442 |
| 6,393,249 B1 | * | 5/2002 | Aslam ................ G03G 15/2053 219/216 |
| 7,328,786 B2 | | 2/2008 | Anderson |
| 7,350,340 B2 | | 4/2008 | Anderson |
| 7,380,653 B2 | | 6/2008 | Anderson |
| 7,674,491 B2 | * | 3/2010 | Pool ................... B65D 33/2508 383/100 |
| 7,837,195 B2 | * | 11/2010 | Moore, Jr. ........... B65G 21/209 271/275 |
| 7,963,090 B2 | | 6/2011 | Ours |
| 8,322,117 B2 | | 12/2012 | Ours |
| 2004/0045261 A1 | * | 3/2004 | Sperry .................... B65B 9/026 53/436 |
| 2007/0119127 A1 | * | 5/2007 | Anderson ............. B65B 53/063 53/557 |
| 2008/0010944 A1 | * | 1/2008 | Lerner ...................... B65B 1/28 53/79 |
| 2009/0218035 A1 | * | 9/2009 | Malterer ............. B29C 43/3697 156/110.1 |
| 2012/0199627 A1 | * | 8/2012 | Newhouse ............. B65H 20/02 226/181 |

* cited by examiner

METHOD AND APPARATUS FOR REMOVING AIR FROM AN ARTICLE-FILLED BAG WITH OSCILLATING RINGS

BACKGROUND

The present disclosure generally relates to material handing devices used for bagged products, and more specifically to an apparatus for expelling air from a bagged product.

For effective product protection and economical storage and shipment of such products or articles, it is a common exercise to cover the articles with bags made from a flow wrap material, such as polyvinyl chloride or polypropylene soft film. When placed on a conveyor line, the bags are open at both ends. During a packaging process, the bag is first sealed at one end, and then sealed at the opposite end, as the package moves along a conveyor line.

When the packaging is intended to contain an assembly or individual components or a plurality of distinctly shaped articles, a substantial amount of air may be trapped within the interior of the bag during the sealing process. In one embodiment, one of the components or plurality of articles may be significantly larger than other components and the one component or article may support the film in such a manner to cause a tenting effect where there is significant spacing between one of the sides of the film and the other components. In another embodiment, air flow around the bag during the sealing process may cause the bag to be slightly inflated before the second sealing step occurs. If an excess amount of air is trapped during the sealing process, a larger package results, thereby taking up extra space in shipping cartons.

Also, when the sealed bag has an excess amount of trapped air and then the bag is subjected to reduced atmospheric pressure, the bag may burst at reduced atmospheric pressure. For example, when the bag contains too much air, the bag is prone to self-rupturing during airplane transportation. Maintaining an appropriate amount of air in the bag during the packaging process is costly and often difficult. Thus, there is a need for developing an improved air removal apparatus to reduce amount of trapped air in sealed bags. There is a further need for developing an air removal apparatus that may reduce the amount of trapped air in a bag that contains a plurality of differently shaped articles or components in an assembly.

SUMMARY

The present disclosure is directed to an air removal apparatus for reducing air from a bag or a package containing articles, using a set of gravity-actuated rings. Specifically, as the bag advances on a conveyor belt of a conveyor system, the air removal apparatus uses weighted rings to expel excess air from the bag by gravitationally applying pressure at multiple points across the bag. A crossbar or a horizontal shaft supported by spaced wheels is provided so that the rings are mounted to the shaft above the conveyor belt. As the bag advances below the rings in a direction of belt travel during a packaging process, the rings freely rotate in an orbital motion about the shaft and depress an upper surface of the bag to expel trapped air.

An important aspect of the present apparatus is that each ring has a centered opening for accommodating the shaft. This centered opening allows the rings to oscillate in upward and downward directions relative to the shaft, thereby generally following profiles of the articles in the bag. Under gravity caused by the weight of each ring, the air escapes from the bag as the rings downwardly depress the bag while the bag is conveyed beneath the rings. As described in further detail below, the present apparatus provides a structurally reliable, effective and inexpensive way of removing air during packaging. Connection of the present apparatus to the conveyor system is preferably achieved by simple transverse threaded fasteners or the like, and components of the present apparatus are easily assembled without requiring complex tools. As such, the present apparatus reduces installation time and is inexpensively maintained.

In one embodiment, an apparatus is provided for removing air from a bag containing articles while the bag is traveling on a moving conveyor belt. A horizontal shaft is disposed in operational relationship to the conveyor belt. A plurality of rings is provided such that each ring has a thickness and a centered opening dimensioned to loosely accommodate the shaft and to rotationally oscillate relative to the shaft. Each ring is vertically displaceable relative to the shaft. Each ring independently generally follows an irregular contour defined by the articles to expel air by downwardly depressing an outer surface of the bag under gravity caused by weight of each ring while the bag is carried on the conveyor belt below the rings. A radial distance between the shaft and the ring is greater than a diameter of the shaft.

In another embodiment, a method of removing air from a bag configured for accommodating at least one article while the bag is traveling on a moving conveyor belt of a conveyor system is provided that includes advancing the bag having a first sealed end and an opposite second open end, on the conveyor belt toward a plurality of rings in a direction of belt travel, each ring having a centered opening dimensioned to loosely accommodate a horizontal shaft. The rings are loosely mounted to the shaft so that each ring freely rotationally oscillates relative to the shaft in an orbital motion about the shaft. The at least one article in the bag defines an irregular contour, and the rings are constructed and arranged so that the rings independently generally follow the contour of each article to expel air from the second end of the bag. In use, the rings downwardly depress an outer surface of the bag under gravity caused by the weight of each ring while the bag is carried on the conveyor belt beneath the rings.

The foregoing and other aspects and features of the disclosure will become apparent to those of reasonable skill in the art from the following detailed description, as considered in conjunction with the accompanying drawings.

DETAILED DESCRIPTION

Figure 1:
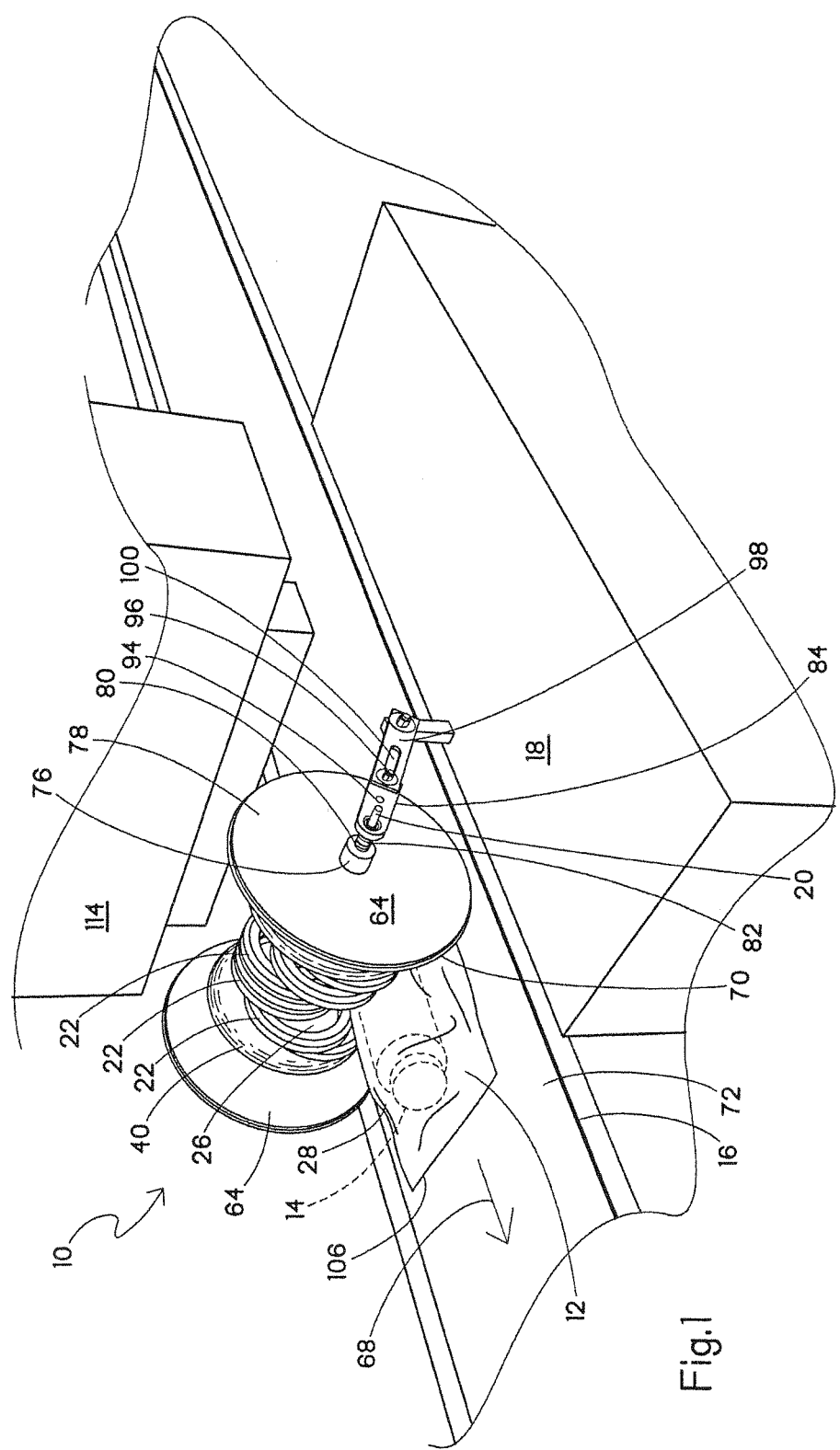
FIG. 1 is a top perspective view of the present air removal apparatus featuring a set of weighted rings.

Referring now to FIGS. 1-5, the present air removal apparatus is generally designated 10 and is designed to expel air from a bag 12 configured for accommodating one or more articles 14 (shown hidden) while the bag is traveling on a moving conveyor belt 16 of a conveyor system, generally designated 18. Included in the air removal apparatus 10 is a crossbar or horizontal shaft 20 disposed in operational relationship to the conveyor belt 16. One or more rings 22 are mounted to and suspended from the shaft 20 above the conveyor belt 16. Although only one shaft 20 is shown for illustration purposes, more than one shaft can be used to have multiple rows of rings 22 mounted along a travel path of the conveyor belt 16. Each ring 22 has a thickness 24 (FIGS. 4 and 5) and a centered opening 26 dimensioned to loosely accommodate the shaft 20. It is contemplated that the present air removal apparatus 10 can be installed in a stationary packaging device without the conveyor system 18.

It is contemplated that the rings 22 are made of any self-supporting, rigid material, including but not limited to plastic, metal, engineered materials, wood or other equivalent materials. A main consideration in selecting the material for the rings 22 is that the wheels are of sufficient weight to collapse the film of the bag 12 onto the articles 14 contained within the bag, but not being overly heavy to cause damage to the articles.

In operation, the rings 22 rotationally oscillate relative to the shaft 20 such that each ring is freely rotatable and movable in an orbital motion about the shaft and is vertically displaceable relative to the shaft. The orbital motion refers to a HULA-HOOP®toy hoop-like motion around the shaft 20. In other words, a spinning motion of each ring 22 resembles a rotating motion of the HULA-HOOP® around a user's waist. Not all rings 22 are in constant contact with the bag 12, but at least one or more rings directly press down upon the bag 12 to remove trapped air prior to a final bag sealing step.

Specifically, each ring 22 independently generally follows a corresponding irregular contour defined by the one or more articles 14 to expel air from the bag 12 by downwardly depressing an outer surface 28 of the bag. More specifically, gravitational pressure caused by and proportional to the weight of each ring 22 is applied onto the bag 12 while the bag is carried on the conveyor belt 16 beneath the rings. As a result, the rings 22 conform to a corresponding profile of the articles 14 as each ring is gravitationally actuated in a vertical plane extending transverse to an axis defined by the shaft 20. A rolling momentum of each ring 22 is triggered by gravity and enhances effectiveness of the apparatus 10 as the ring ascends and descends along the outer surface 28 of an article-filled bag 12. It is also contemplated that the gravitational pressure is assisted by a piston (not shown). Although a circular shaped ring 22 is shown for illustration purposes, other various geometrical shapes, such as oval, elliptical, and polygonal shapes are also contemplated.

In a preferred embodiment, the rings 22 are disposed above the bag 12, but an additional or alternative row(s) of rings are optionally positioned underneath the bag. For example, the article-filled bag 12 is sandwiched between a top row and a bottom row of the rings 22 as the bag is carried on the conveyor belt 16. It is also contemplated that the bag 12 remains stationary on the conveyor belt 16 while the apparatus 10 autonomously travels over and/or under the bag.

Figure 3:
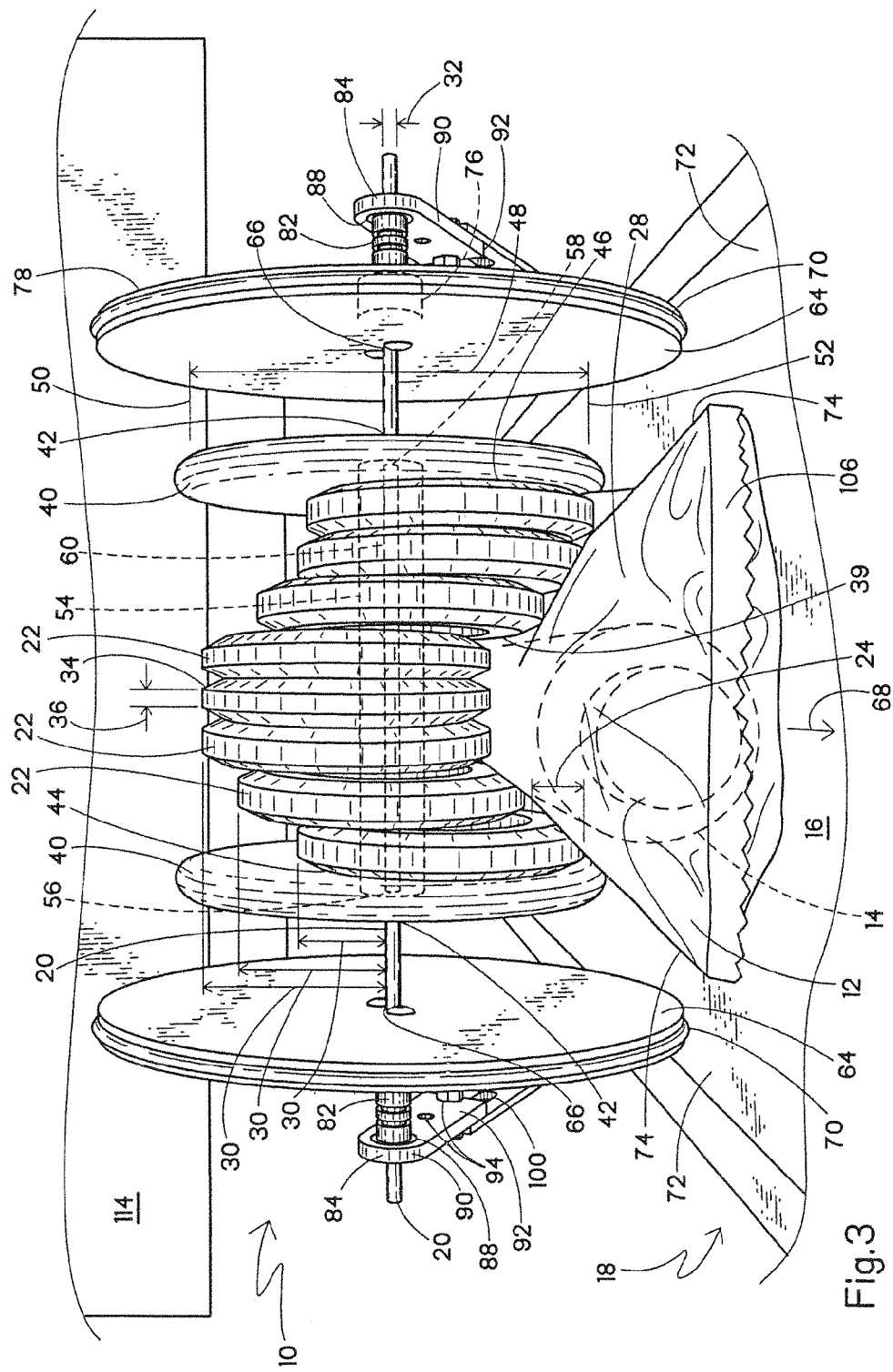
FIG. 3 is an enlarged front perspective view of the air removal apparatus of FIG. 2.
Figure 4:
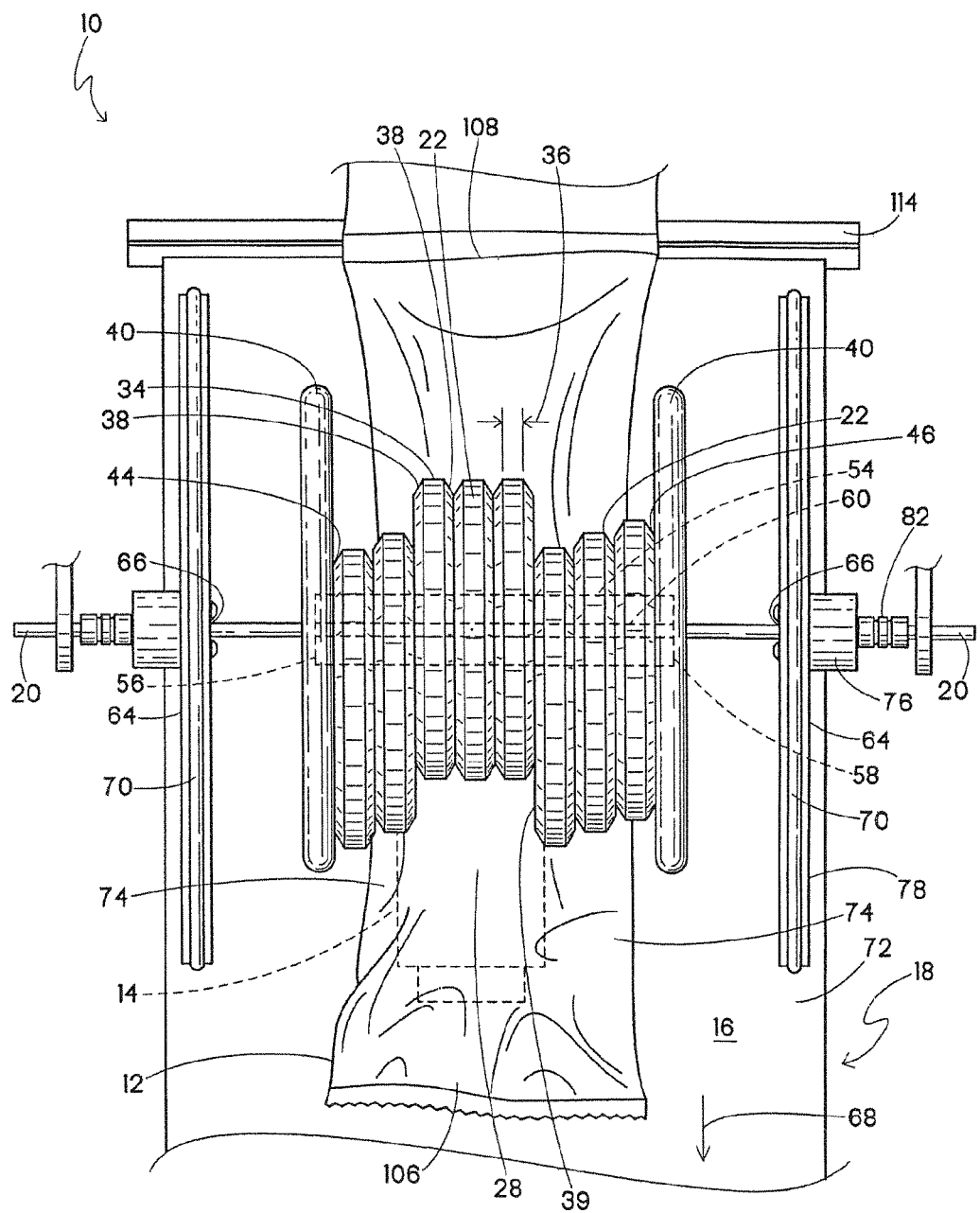
FIG. 4 is an enlarged top plan view of the air removal apparatus of FIG. 2.
Figure 5:
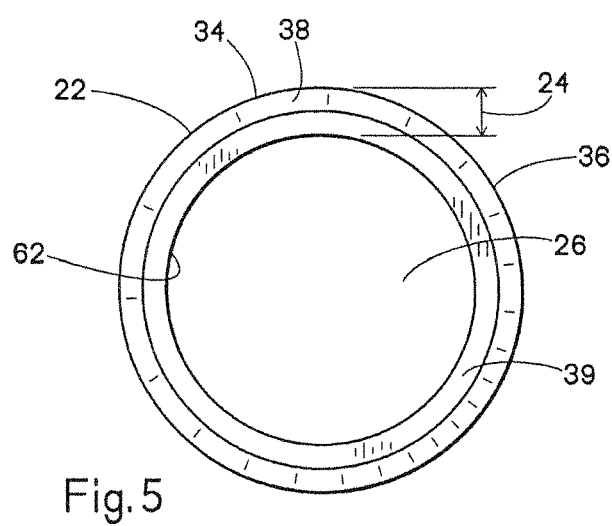
FIG. 5 is an enlarged side view of the present ring.

Referring now to FIGS. 3-5, an important aspect of each ring 22 is that a radial distance 30 associated with a corresponding vertical position of each ring between the shaft 20 and a peripheral edge or surface of the ring is greater than a diameter 32 of the shaft 20. This distance 30 allows the rings 22 to rotationally oscillate in upward and downward directions about the shaft 20 as the bag 12 passes below the rings on the conveyor belt 16. Preferably, the thickness 24 (FIG. 5) of each ring 22 is less than the radial distance 30. During the rotational movement of the rings 22 while accommodating the passage of the bag 12 filled with the articles 14, the rings are in sliding contact with each other. Spacing between adjacent rings 22 is unfixed such that the spacing is variably changeable during the rotational movement of the rings. It is preferred that a peripheral surface 34 of each ring 22 has a planar middle section 36 sandwiched between generally curved or radiused edges 38. Sidewalls 39 of adjacent rings slide relative to each other as the rings 22 oscillate in response to the travel of the filled bag 12 beneath the device 10.

A pair of guide wheels 40 is preferably provided for holding the rings 22 together on the shaft 20. Each guide wheel 40 has a centered bore 42 for accommodating the shaft 20. Both guide wheels 40 are mounted to the shaft 20 and respectively disposed on opposite outermost ends 44, 46 (FIGS. 3 and 4) of the rings 22 such that the rings are sandwiched between the guide wheels for maintaining the rings in the relative sliding position in relation to each other described above as the article-filled bag 12 passes beneath the apparatus 10. Preferably, as best shown in FIG. 3, each guide wheel 40 has a diameter greater than a diameter of each ring 22 for laterally confining or constraining the rotational movement of each ring relative to the shaft 20. Another aspect of the present guide wheel 40 is that a diameter of each guide wheel is substantially equal or greater than a distance 48 between an uppermost operational limit 50 and a lowermost operational limit 52 of each ring 22 during its rotational movement.

Figure 2:
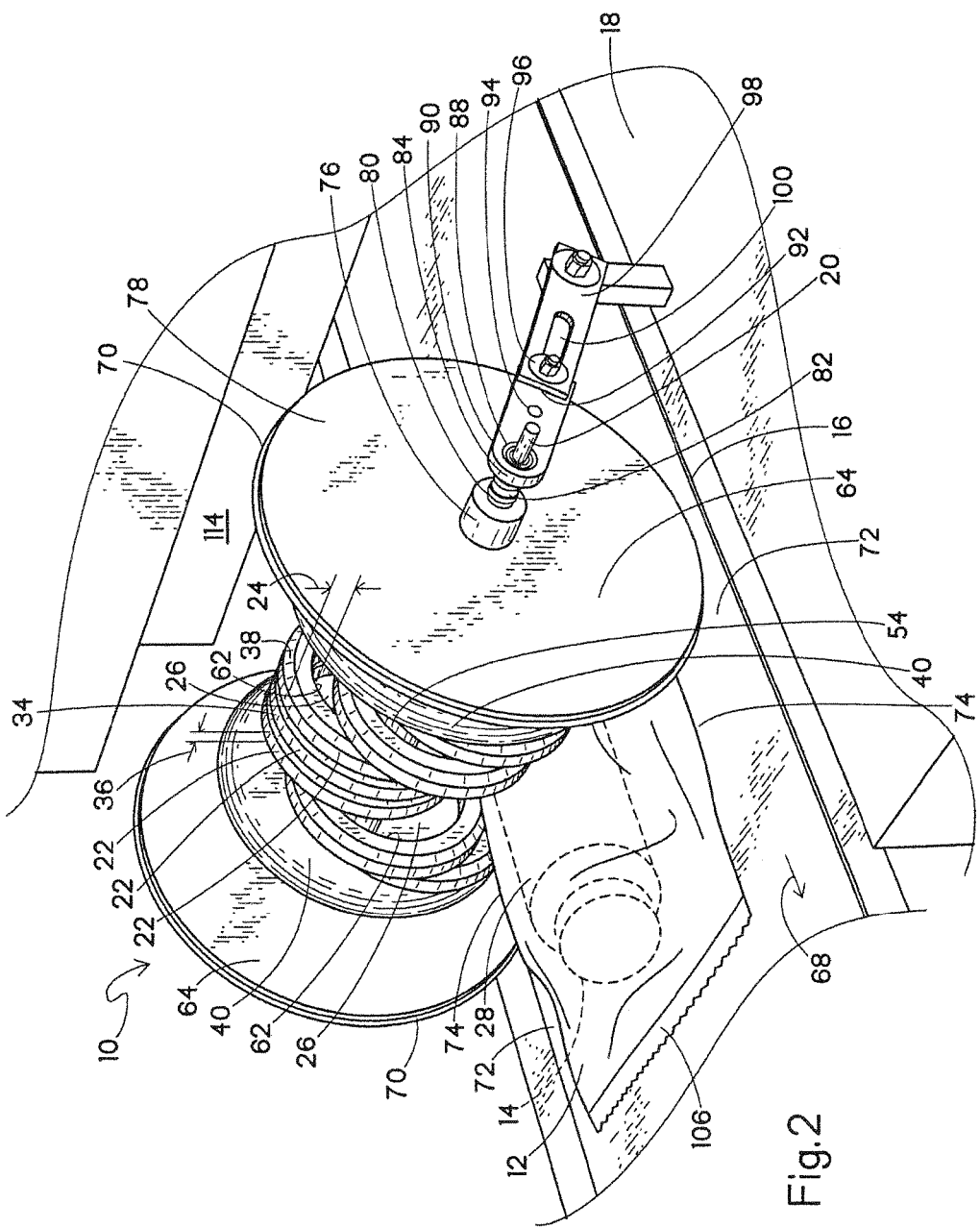
FIG. 2 is an enlarged top perspective view of the air removal apparatus of FIG. 1 while a bag having articles passes beneath the apparatus.

A cylindrical support member 54 (shown hidden) is connected to the respective guide wheels 40 at each opposite end 56, 58 using chemical adhesive, ultrasonic welding or the like to securely hold the guide wheels mounted to the shaft 20. As with the guide wheels 40, the support member 54 has a centered bore 60 for accommodating the shaft 20. Specifically, as best shown in FIG. 2, the support member 54 is inserted into the opening 26 of each ring 22 such that the support member 54 sporadically engages an inner circumferential surface 62 of each ring 22 as the conveyor belt 16 passes beneath the apparatus 10.

A pair of conveyor wheels 64 configured to rotate with the shaft 20 is provided to support the apparatus 10 on the conveyor belt 16. Each conveyor wheel 64 also has a centered bore 66 for accommodating the shaft 20. As the conveyor belt 16 advances in a direction of travel 68, a peripheral, preferably traction-enhanced or tired edge 70 of each conveyor wheel 64 constantly engages a top surface 72 of the conveyor belt 16. It is also contemplated that the guide wheels 40 are omitted from the device 10, and additional rings 22 are provided to span the space between the conveyor wheels 64.

To maintain a substantially constant clearance between the top surface 72 of the conveyor belt 16 and the guide wheels 40, each conveyor wheel 64 has a diameter greater than a diameter of each guide wheel. This clearance facilitates positioning of the guide wheels 40 and the rings 22 at a desired predetermined height above the conveyor belt 16 so that the bag 12 is not fully but partially depressed by the rings 22. Each conveyor wheel 64 is laterally spaced from the respective guide wheel 40 at a predetermined distance along the shaft 20 for maintaining a clearance between the bag 12 and the conveyor wheels 64 so that both side edges 74 of the bag are not in contact with the conveyor wheels.

A connecting member 76 is releasably connected to an outer wall 78 of each conveyor wheel 64, and has a centered bore 80 for receiving the shaft 20. Optionally, a pair of spacers 82 and a pair of corresponding arm extension bars 84 are provided for mechanical connection of the apparatus 10 to the conveyor system 18. Specifically, each spacer 82 is disposed between the corresponding conveyor wheel 64 and the corresponding arm extension bar 84. Each spacer 82 has a bore for accommodating the shaft 20 such that the spacer freely rotates about the shaft. Each arm extension bar 84 also has a bore 88 at one end 90 for receiving a corresponding end of the shaft 20, and toward an opposite end 92 has a plurality of apertures 94 for selectively receiving a fastener 96, such as a transverse threaded bolt, for length adjustment of the arm extension bar relative to the conveyor system 18.

Optionally, an adjustable positioning arm 98 is connected to the respective arm extension bar 84, and defines an elongated slot 100 for selectively adjusting an overall length of the arm relative to the arm extension bar. When assembled, the shaft 20 passes through the corresponding bores 42, 60, 66, 80, 88 of the arm extension bars 84, the spacers 82, the connecting member 76, the conveyor wheels 64, the supporting member 54, the guide wheels 40, and the openings 26 of the rings 22.

Figure 6:
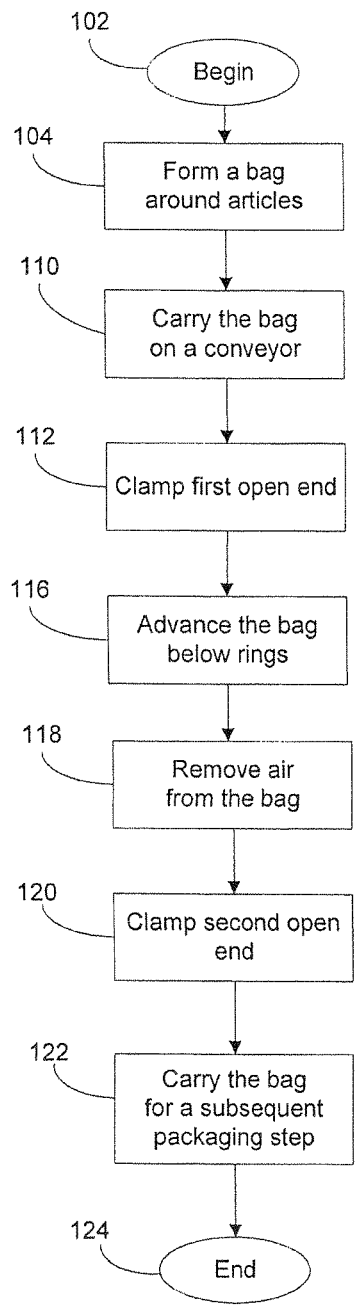
FIG. 6 illustrates an exemplary method of removing air from an article-filled bag using the present apparatus.

Referring now to FIG. 6, an exemplary method of removing air is shown using the present apparatus 10. Although the following steps are primarily described with respect to the embodiments of FIGS. 1-5, it should be understood that the steps within the method may be modified and executed in a different order or sequence without altering the principles of the present disclosure.

The method begins at step 102. In step 104, the one or more articles 14 are inserted into the bag 12, thereby forming an article-filled bag having a first open end 106 and an opposite second open end 108 (FIGS. 1 and 4). In step 110, the article-filled bag 12 is carried on the conveyor belt 16 in the direction of belt travel 68 toward the apparatus 10. In step 112, the first open end 106 is clamped and sealed by a heat sealer 114 as the bag 12 passes under the sealer to form a front seal. In step 116, the bag 12 advances toward the apparatus 10 under the action of the conveyor belt 16 and begins to pass below the rings 22. In step 118, as the bag 12 travels underneath the rings 22, the rings apply pressure to the bag to expel air in a manner described above. Note that the second open end 108 is not yet sealed.

In step 120, the second open end 108 is clamped and sealed by the sealer 114 (FIG. 3) to form a rear seal. An important aspect of the present apparatus 10 is that only partial amount of air is expelled from the bag 12. More specifically, sealing of the second end 108 is performed after the first end 106 is advanced a predetermined distance in the direction of belt travel 68 relative to the shaft 20.

At this point, no more air can escape from the bag 12. If an additional amount of air removal is desired, a location of the apparatus 10 may be adjusted relative to the sealer 114. For example, the extension bars 84 are slidably adjusted along the slots 100 of the arms 98 relative to an operation axis of the conveyor belt 16 such that the rings 22 are closer to the sealer 114. Also, stopping the advance of the bag 12 on the conveyor belt 16 for a predetermined period is contemplated to allow some amount of air to remain in the bag before sealing the second end 108. In step 122, the fully sealed bag 12 is carried on the conveyor belt 16 for a subsequent packaging process step. The method ends at step 124.

While a particular embodiment of the present air removal apparatus has been described herein, it will be appreciated by those skilled in the art that changes and modifications may be made thereto without departing from the present disclosure in its broader aspects and as set forth in the following claims.

The invention claimed is:

1. An apparatus for removing air from a bag configured for accommodating one or more articles while the bag is traveling on a moving conveyor belt of a conveyor system, comprising:
   a horizontal shaft disposed in operational relationship to the conveyor belt;
   a plurality of rings, each ring having a thickness and a centered opening dimensioned to loosely accommodate said shaft and to rotationally oscillate relative to said shaft such that each ring is vertically displaceable relative to said shaft, each ring separated from said shaft by a space defined by an inner surface of each said ring and an outer surface of said shaft without having any intervening material directly and consistently engaging the inner surface of each said ring and the outer surface of said shaft;
   wherein each ring independently and generally follows a corresponding contour defined by the one or more articles to expel air from the bag by downwardly depressing an outer surface of the bag, solely caused by weight of each ring while the bag is carried on the conveyor belt below said rings; and
   wherein a radial distance between the outer surface of said shaft and a peripheral inner surface of said ring is greater than a diameter of said shaft when assembled for generating said rotational oscillation.

2. The apparatus of claim 1, wherein the thickness of each said ring is less than the radial distance.

3. The apparatus of claim 1, wherein said rings are in sliding contact with each other during the rotational movement of said rings such that each ring is freely rotatable and movable in an orbital motion about said shaft.

4. The apparatus of claim 1, wherein spacing between adjacent rings is unfixed such that a relative vertical position of adjacent rings is changeable during the rotational movement of said rings.

5. The apparatus of claim 1, wherein the peripheral surface of each said ring has a planar middle section sandwiched between generally curved edges.

6. The apparatus of claim 1, further comprising a pair of guide wheels, each guide wheel having a centered bore for accommodating said shaft, both guide wheels respectively disposed on opposite outermost ends of said plurality of rings such that said rings are sandwiched between said guide wheels for maintaining said rings in position in relation to each other as the article-filled bag passes beneath said apparatus.

7. The apparatus of claim 6, wherein each said guide wheel has a diameter greater than an outer diameter of each said ring for laterally constraining the rotational movement of each ring relative to said shaft.

8. The apparatus of claim 6, wherein a diameter of each said guide wheel is substantially equal to or greater than a distance between an uppermost operational limit and a lowermost operational limit of each said ring during the rotational movement.

9. The apparatus of claim 6, further comprising a cylindrical support member having a centered bore for accommodating said shaft, each end of said support member being connected to said respective guide wheel.

10. The apparatus of claim 9, wherein said support member is inserted into said opening of each said ring such that said support member engages an inner circumferential surface of each said ring as the conveyor belt passes beneath said apparatus.

11. The apparatus of claim 6, further comprising a pair of conveyor wheels configured to rotate with said shaft, each said conveyor wheel having a centered bore for accommodating said shaft, a peripheral edge of each said conveyor wheel constantly engaging a top surface of the conveyor belt.

12. The apparatus of claim 11, wherein each said conveyor wheel has a diameter greater than a diameter of each said guide wheel such that said guide wheels and said rings are rotatably mounted to said shaft at a predetermined height above the conveyor belt.

13. The apparatus of claim 11, wherein each said conveyor wheel is laterally spaced from said respective guide wheel at a predetermined distance along said shaft for maintaining a clearance between the bag and said pair of conveyor wheels.

14. A method of removing air from a bag configured for accommodating at least one article while the bag is traveling on a moving conveyor belt of a conveyor system, comprising:
advancing the bag having a first sealed end and an opposite second open end, on the conveyor belt toward a plurality of rings in a direction of belt travel, each said ring having a centered opening dimensioned to loosely accommodate a horizontal shaft, each ring separated from said shaft by a space defined by an inner surface of each said ring and an outer surface of said shaft without having any intervening material directly and consistently engaging the inner surface of each said ring and the outer surface of said shaft;
loosely rotating said rings relative to said shaft so that each said ring freely rotationally oscillates relative to said shaft in an orbital motion about said shaft;
providing the bag on the conveyor belt, the bag having the first sealed end and the opposite second open end, the at least one article in the bag defining a contour, said rings being constructed and arranged so that said rings independently and substantially follow the contour of each article to expel air from the second end of the bag; and
depressing an outer surface of the bag solely caused by weight of each ring while the bag is carried on the conveyor belt beneath said rings.

15. The method of claim 14, further comprising sealing the second end of the bag after the first end is advanced a predetermined distance in the direction of belt travel relative to said shaft.

16. The method of claim 14, further comprising stopping the advance of the bag for a predetermined period to allow a predetermined amount of air to remain in the bag before sealing the second end.

17. The method of claim 14, further comprising selectively adjusting a location of said rings on the conveyor system relative to an operation axis of the conveyor belt.

* * * * *